(12) United States Patent
McNeil

(10) Patent No.: US 9,261,132 B2
(45) Date of Patent: Feb. 16, 2016

(54) LOW FRICTION BEARING ASSEMBLY AND LINK APPARATUS

(71) Applicant: Roller Bearing Company of America, Inc., Oxford, CT (US)

(72) Inventor: Scott McNeil, Gilford, NH (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/230,512

(22) Filed: Mar. 31, 2014

(65) Prior Publication Data

US 2014/0294484 A1    Oct. 2, 2014

Related U.S. Application Data

(63) Continuation-in-part of application No. 12/766,348, filed on Apr. 23, 2010, now abandoned.

(60) Provisional application No. 61/172,366, filed on Apr. 24, 2009.

(51) Int. Cl.
*F16C 7/00* (2006.01)
*F16C 7/02* (2006.01)
(Continued)

(52) U.S. Cl.
CPC ... *F16C 9/04* (2013.01); *F16C 7/02* (2013.01); *F16C 11/0614* (2013.01); *F16C 23/045* (2013.01); *F16C 33/201* (2013.01); *F16C 43/02* (2013.01); *Y10T 403/29* (2015.01)

(58) Field of Classification Search
CPC ............... F16C 5/00; F16C 7/06; F16C 7/08; F16C 9/04

USPC .......................... 384/206–208, 213, 214, 300
See application file for complete search history.

(56) References Cited

U.S. PATENT DOCUMENTS

| 1,457,584 A | 6/1923 | McCuen |
| 2,067,464 A | 1/1937 | Smith |

(Continued)

FOREIGN PATENT DOCUMENTS

| DE | 19750113 A1 | 5/1998 |
| DE | 10110067 A1 | 9/2002 |

(Continued)

OTHER PUBLICATIONS

International Search Report for corresponding PCT Application No. PCT/US2013/076557, dated Jun. 5, 2014.

(Continued)

*Primary Examiner* — James Pilkington
(74) *Attorney, Agent, or Firm* — MKG LLC

(57) ABSTRACT

A link apparatus includes a tubular member that retains 90% of ultimate tensile strength at a temperature of up to 329.44° Celsius (625° Fahrenheit). Two conical adapters are joined to ends of the tubular member. One threaded shank of a rod end is threaded into a right hand threaded base of one conical adapter, and a threaded shank of another rod end is threaded into a left hand threaded base of the other conical adapter. Each rod end has a bearing assembly disposed therein including an outer race, a ball disposed therein, and a low-friction liner disposed between the outer race and ball for mitigating moment loading on the tubular member. The cross-sectional area of the tubular member is at least as great as the cross sectional area of the rod ends. The tubular member is tensionable by rotation relative to the rod ends.

14 Claims, 6 Drawing Sheets

(51) Int. Cl.
  *F16C 9/04* (2006.01)
  *F16C 11/06* (2006.01)
  *F16C 33/20* (2006.01)
  *F16C 23/04* (2006.01)
  *F16C 43/02* (2006.01)

(56) References Cited

U.S. PATENT DOCUMENTS

| | | | |
|---|---|---|---|
| 2,620,147 A | 12/1952 | Butler et al. | |
| 2,766,079 A | 10/1956 | Browne | |
| 2,807,509 A | 9/1957 | Anderson | |
| 2,813,395 A | 11/1957 | Meyer | |
| 2,822,225 A | 2/1958 | Teufel | |
| 2,908,532 A | 10/1959 | Runton et al. | |
| 3,266,123 A | 8/1966 | McCloskey | |
| 3,458,223 A | 7/1969 | White | |
| 3,550,232 A | 12/1970 | Burnett | |
| 3,582,166 A | 6/1971 | Reising | |
| 3,656,821 A | 4/1972 | McCloskey et al. | |
| 3,769,672 A | 11/1973 | Eklund | |
| 3,779,619 A | 12/1973 | Van Dorn et al. | |
| 3,913,990 A | 10/1975 | Eklund | |
| 3,932,008 A | 1/1976 | McCloskey et al. | |
| 3,954,225 A | 5/1976 | Camboulives et al. | |
| 4,048,370 A | 9/1977 | Orkin et al. | |
| 4,053,665 A | 10/1977 | Orkin et al. | |
| 4,097,163 A * | 6/1978 | Dubuque | 403/274 |
| 4,111,499 A | 9/1978 | McCloskey | |
| 4,118,009 A | 10/1978 | Chmura | |
| 4,134,842 A | 1/1979 | Orkin et al. | |
| 4,171,787 A | 10/1979 | Zapel | |
| 4,189,249 A | 2/1980 | Gaines et al. | |
| 4,204,719 A | 5/1980 | Murphy | |
| 4,232,436 A | 11/1980 | Chmura | |
| 4,243,192 A | 1/1981 | Johnson | |
| 4,248,486 A | 2/1981 | Bradley, Jr. | |
| 4,253,711 A | 3/1981 | Lynn et al. | |
| 4,399,970 A | 8/1983 | Evans | |
| 4,437,631 A | 3/1984 | Martens et al. | |
| 4,471,928 A | 9/1984 | Cole | |
| 4,509,871 A | 4/1985 | Herzog et al. | |
| 4,571,936 A | 2/1986 | Nash et al. | |
| 4,650,140 A | 3/1987 | Cole | |
| 4,717,268 A | 1/1988 | Orkin | |
| 4,753,402 A | 6/1988 | Cole | |
| 4,755,104 A | 7/1988 | Castro et al. | |
| 4,838,503 A | 6/1989 | Williams | |
| 4,848,934 A | 7/1989 | Blakely et al. | |
| 4,887,919 A | 12/1989 | Hamblin | |
| 4,973,172 A | 11/1990 | Nisley et al. | |
| 5,009,524 A | 4/1991 | Dittenhoefer | |
| 5,028,151 A | 7/1991 | Nisley | |
| 5,073,038 A | 12/1991 | O'Connell | |
| 5,245,823 A | 9/1993 | Barcza | |
| 5,288,354 A | 2/1994 | Harris et al. | |
| 5,417,056 A | 5/1995 | Johnson et al. | |
| 5,615,967 A | 4/1997 | Hellon | |
| 5,775,815 A | 7/1998 | Abusamra | |
| 5,839,699 A | 11/1998 | Bliesner | |
| 5,839,835 A | 11/1998 | Zernickel et al. | |
| 5,893,518 A | 4/1999 | Bruchez, Jr. et al. | |
| 6,149,105 A | 11/2000 | Jaggard | |
| 6,173,824 B1 | 1/2001 | Roberts | |
| 6,180,574 B1 | 1/2001 | Ryan et al. | |
| 6,365,556 B1 | 4/2002 | Drew | |
| 6,742,324 B2 | 6/2004 | Bachelder et al. | |
| 6,921,249 B1 | 7/2005 | Haynie et al. | |
| 6,926,446 B2 | 8/2005 | Grehn et al. | |
| 6,994,475 B2 | 2/2006 | Doll et al. | |
| 7,097,361 B2 | 8/2006 | Rogers | |
| 7,249,735 B2 | 7/2007 | Amorosi et al. | |
| 7,427,163 B2 | 9/2008 | Schoder et al. | |
| 7,828,482 B2 | 11/2010 | Beausoleil et al. | |
| 7,878,714 B2 | 2/2011 | Arnault et al. | |
| 7,909,717 B2 | 3/2011 | Boussaguet et al. | |
| 8,021,053 B2 | 9/2011 | Habibvand | |
| 8,025,257 B2 | 9/2011 | Gyuricsko et al. | |
| 8,387,924 B2 | 3/2013 | Gyuricsko et al. | |
| 8,393,799 B2 | 3/2013 | Dahl | |
| 2004/0022464 A1 | 2/2004 | Schinazi et al. | |
| 2007/0102587 A1 | 5/2007 | Jones et al. | |
| 2007/0189649 A1 | 8/2007 | Montazeri et al. | |
| 2007/0223850 A1 | 9/2007 | Lopes et al. | |
| 2007/0232502 A1 | 10/2007 | Tsutsui et al. | |
| 2008/0230629 A1 | 9/2008 | Martin | |
| 2009/0235643 A1 | 9/2009 | Schirtzinger | |
| 2010/0008612 A1 | 1/2010 | Grehn | |
| 2010/0135606 A1 | 6/2010 | Ehlert et al. | |
| 2010/0269629 A1 | 10/2010 | Nunn et al. | |
| 2011/0019952 A1 | 1/2011 | Gutowski et al. | |
| 2011/0038576 A1 | 2/2011 | Thornton et al. | |
| 2011/0067509 A1 | 3/2011 | Kleibl et al. | |
| 2011/0142532 A1 * | 6/2011 | Diemirbey | 403/56 |
| 2011/0220760 A1 | 9/2011 | Gyuricsko et al. | |
| 2011/0220762 A1 | 9/2011 | Gyuricsko et al. | |
| 2012/0058923 A1 | 3/2012 | Hamel et al. | |
| 2012/0125146 A1 * | 5/2012 | Boveroux et al. | 74/579 R |

FOREIGN PATENT DOCUMENTS

| | | |
|---|---|---|
| EP | 0230681 A2 | 8/1987 |
| EP | 0771956 A1 | 5/1997 |
| EP | 0843106 A1 | 5/1998 |
| EP | 0520968 B2 | 3/2000 |
| EP | 2067696 A2 | 6/2009 |
| EP | 2336584 A2 | 6/2011 |
| GB | 2048181 A | 12/1980 |
| GB | 2213113 A | 8/1989 |
| GB | 2304656 A | 3/1997 |
| JP | Sho57-184721 A | 11/1982 |
| JP | Sho62-113697 A | 5/1987 |
| JP | H10252745 A | 9/1998 |
| JP | 2006-300130 A | 2/2006 |
| WO | 96/17179 A1 | 6/1996 |
| WO | 2006/114237 A1 | 11/2006 |
| WO | 2008/076011 A1 | 6/2008 |
| WO | 2008/147284 A1 | 12/2008 |
| WO | 2012/080983 A1 | 6/2012 |
| WO | 2012/129223 A1 | 9/2012 |

OTHER PUBLICATIONS

Canadian Office Action issued in corresponding Canadian Application No. 2,643,029 dated Oct. 5, 2010.

Notification of the First Office Action issued in corresponding Chinese Patent Application No. 200810181713.7 dated Apr. 1, 2010.

European Search Report issued in corresponding European Application No. 08168716 dated Mar. 14, 2012.

International Search Report issued in corresponding PCT Application No. PCT/US2012/068236 dated Feb. 21, 2013.

Communication issued in corresponding European Application No. 08168716.2 dated Oct. 18, 2011.

Notice of Refusal issued in corresponding Japanese Patent Application No. 2008-302409 dated Mar. 28, 2012.

Notice of Refusal issued in corresponding Japanese Patent Application No. 2008-302409 dated Jul. 29, 2011.

Communication issued in corresponding European Application No. 08168716.2 dated Nov. 27, 2012.

International Preliminary Report on Patentability issued in corresponding PCT Application No. PCT/US2012/029797 dated Oct. 3, 2013.

International Search Report issued in corresponding PCT Application No. PCT/US2012/029797 dated Aug. 7, 2012.

International Search Report for corresponding PCT Application No. PCT/US2013/038626, dated Jan. 20, 2014.

"RBC Aerospace Bearings Swage Tubes and Control Rods" ISO 9001:2000; AS9100B:2004; 3 pages.

Reasons for Refusal for corresponding Japanese Application No. 2012-276286, dated Jan. 28, 2014.

(56) References Cited

OTHER PUBLICATIONS

International Preliminary Report on Patentability for corresponding PCT Application No. PCT/US12/068236, dated Apr. 24, 2014.

Decision of Rejection against Japanese Patent Application No. 2012-276286, Dec. 26, 2014, with attached English Translation.
Extended European Search Report for EP Patent Application No. 14172751.1-1751/2840272, dated Sep. 18, 2015.

* cited by examiner ular movement in an outer race. The outer race defines an inner surface contoured to receive and retain the ball therein. In one type of spherical plain bearing, the outer race is swaged around the spherical outer surface of the ball. These types of spherical plain bearings tend to provide suitable performance in low friction applications. In some cases, particularly those in which the ball and the outer race are each metallic, however, the outer race may be constructed with a slot to permit insertion of the ball. Such bearings are referred to as "load slot bearings."

US 9,261,132 B2

LOW FRICTION BEARING ASSEMBLY AND LINK APPARATUS

CROSS REFERENCE TO RELATED APPLICATION

This application is a Continuation-in-Part of U.S. patent application Ser. No. 12/766,348 filed on Apr. 23, 2010, which application in turn claims the benefit of U.S. Provisional Patent Application No. 61/172,366 filed on Apr. 24, 2009, the contents of each of which are incorporated herein by reference in their entirety.

TECHNICAL FIELD

The present invention relates generally to bearing assemblies and, more particularly, to low friction bearing assemblies for use in a link apparatus.

BACKGROUND

Spherical plain bearings typically comprise a ball positioned for rotational movement in an outer race. The outer race defines an inner surface contoured to receive and retain the ball therein. In one type of spherical plain bearing, the outer race is swaged around the spherical outer surface of the ball. These types of spherical plain bearings tend to provide suitable performance in low friction applications. In some cases, particularly those in which the ball and the outer race are each metallic, however, the outer race may be constructed with a slot to permit insertion of the ball. Such bearings are referred to as "load slot bearings."

The manufacture of load slot bearings generally involves a case hardening process to produce bearing elements having different hardnesses. Lapping or grinding of the outer race may also be employed to produce a bearing having the desired morphological surface characteristics for effective interaction between the outer race and the ball. Also, load slot bearings may include provisions for grease lubrication or use of a dry film lubricant to reduce the friction between the ball and the race. In load slot bearings in which grease lubrication is employed to reduce the friction, the bearing is subject to prescribed maintenance at scheduled intervals. Non-compliance with the prescribed maintenance or with the schedule of maintenance can increase bearing wear and can compromise the life of the bearing. In particular, improper maintenance such as insufficient lubrication can have an impact on bearing operation and promote galling, fretting, and/or other types of wear.

A typical link apparatus fastens or connects one device to another device. Often, one or both ends of the link apparatus must bear a vibratory load under only slight oscillatory motion. Bearing assemblies, typically load slot bearings or spherical plain bearings, are disposed in one or both ends of such a link apparatus. In certain applications, particularly high-temperature applications, the link apparatus and the bearing assemblies disposed therein must meet rigorous material and mechanical properties related to friction, lubrication and wear.

SUMMARY

In one aspect, the present invention resides in a link apparatus comprising: a tubular member manufactured from a material having at least a 90% retention of ultimate tensile strength at a temperature of up to 329.44° Celsius (625° Fahrenheit), the tubular member having a first diameter and a first cross-sectional area; a first conical adapter having a first base and a first conical flare, the first conical flare being mechanically joined to a first end of the tubular member, the first conical flare defining a second diameter about equal to the first diameter, the first base member having a right hand threaded end defined by a third diameter which is less than the second diameter; a second conical adapter having a second base and a second conical flare, the second conical flare being mechanically joined to a second end of the tubular member, the second conical flare defining the second diameter, the second base member having a left hand threaded end defined by the third diameter; a first rod end and having a first threaded shank and a first socket, the first threaded shank removably threaded into the right hand threaded first base of the first conical adapter, the first socket having a first bearing assembly disposed therein; a second rod end and having a second threaded shank and a second socket, the second threaded shank removably threaded into the left hand threaded second base of the second conical adapter, the second socket having a second bearing assembly disposed therein; and each of the first bearing assembly and the second bearing assembly comprising, an outer race having an inner engagement, a ball having an outer surface and a bore extending therethrough, the ball disposed at least partially in the outer race, the outer race being misalignable and rotatable in relation to the ball, an area of engagement defined by an interface of the inner engagement surface of the outer member and the outer surface of ball, and a low-friction liner disposed within the area of engagement; the liner mitigating moment loading on the tubular member; the first rod end and the second rod end each having a second cross-sectional area; the first cross-sectional area of the tubular member defining a smallest cross-sectional area about equal to the second cross sectional area of the first and second rod ends; and the tubular member being tensionable by rotation relative to the first and second rod ends.

DETAILED DESCRIPTION

Figure 1A:
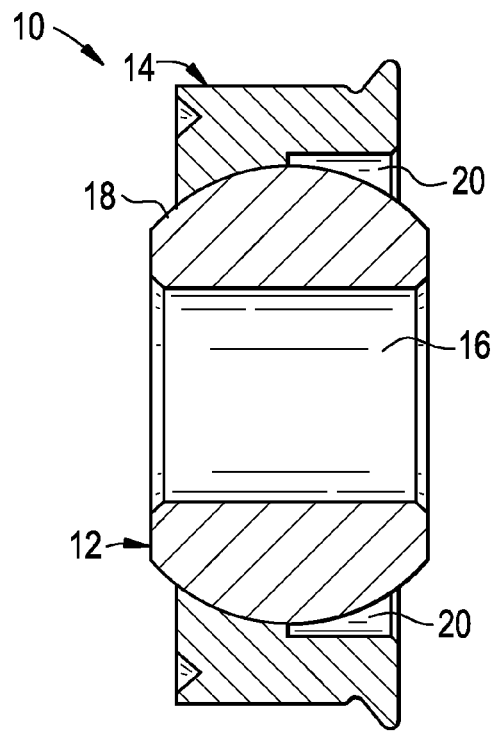
FIG. 1A is a side sectional view of a low friction load slot bearing assembly for use in a link apparatus of the present invention.
Figure 2:
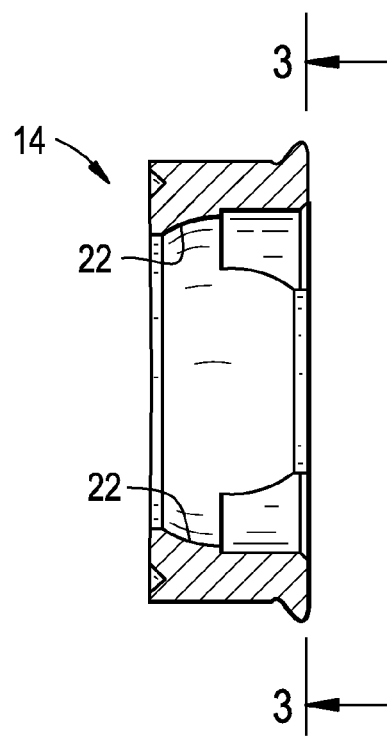
FIG. 2 is a side sectional view of an outer race of the low friction load slot bearing assembly of FIG. 1A with the ball element removed.

As is shown in FIGS. 1A and 2, a load slot bearing assembly of the present invention is designated generally by the reference number 10 and is hereinafter referred to as "bearing assembly 10." Bearing assembly 10 includes a ball 12 positioned in an outer race 14 such that the outer race 14 is misalignable and rotatable in relation to the ball 12. The ball 12 defines a bore 16 extending either part of the way or completely therethrough and is adapted to receive a portion of a shaft or other component therein. The present invention is not so limited, as the ball 12 may be integral with or form part of a shaft or other component. In the illustrated embodiment, the outer race 14 is a ring having an inner surface, a first portion of which is an inner engagement surface (designated by the reference number 22 in FIG. 2) contoured to a shape complementary to an outer surface 18 of the ball 12. A second portion of the inner surface of the outer race 14 defines two load slots 20. Each load slot 20 is arcuate and extends inwardly from one end of the outer race 14. While the outer race 14 has been shown and described as a ring, the present invention is not limited in this regard as the outer race can assume any practical shape or be part of another component, such as, for example a housing, without departing from the broader aspects of the invention.

Figure 1B:
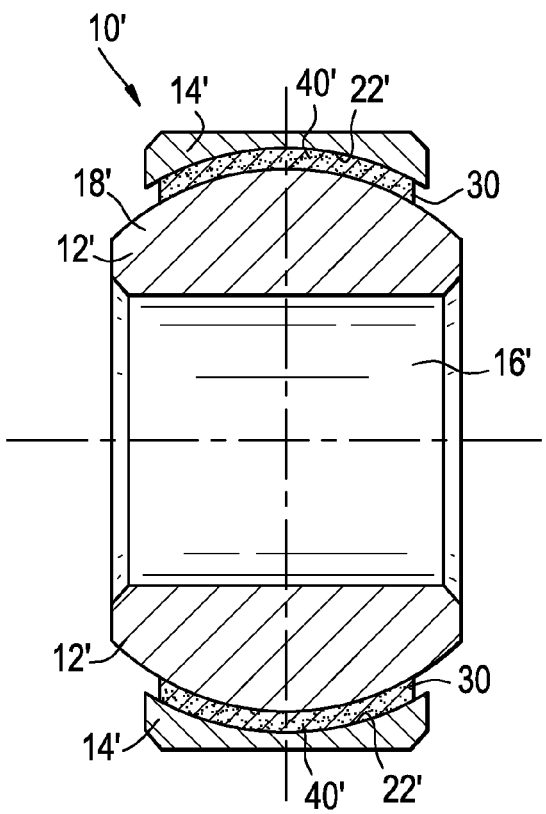
FIG. 1B is a side sectional view of a low friction lined spherical plain bearing assembly for use in a link apparatus of the present invention.

As is shown in FIG. 1B, a spherical plain bearing assembly for use in a link apparatus of the present invention is designated generally by the reference number 10' and is hereinafter referred to as "bearing assembly 10'". Bearing assembly 10' includes a ball 12' positioned in an outer race 14' such that the outer race 14' is misalignable and rotatable in relation to the ball 12'. The ball 12' defines a bore 16' extending either part of the way or completely therethrough and is adapted to receive a portion of a shaft or other component therein. The present invention is not so limited, as the ball 12' may be integral with or form part of a shaft or other component. In the illustrated embodiment, the outer race 14' is a ring having an inner surface, a first portion of which is an inner engagement surface 22' contoured to a shape complementary to an outer surface 18' of the ball 12'. While the outer race 14' has been shown and described as a ring, the present invention is not limited in this regard as the outer race can assume any practical shape or be integrally formed with another component, such as, for example a housing, without departing from the broader aspects of the invention.

Figure 3:
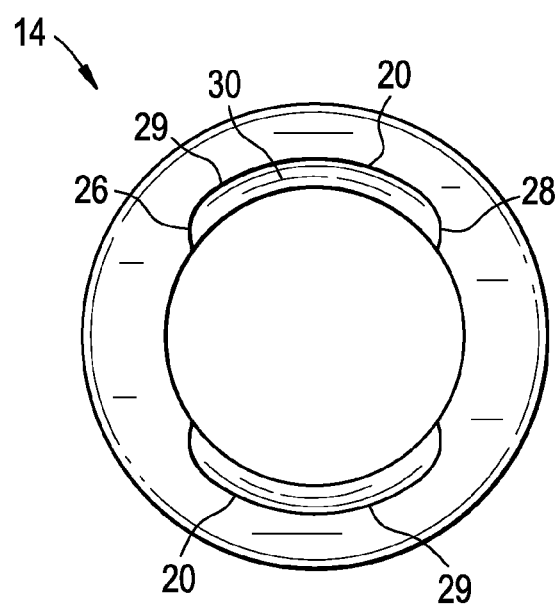
FIG. 3 is a front view of the outer race of the low friction load slot bearing assembly of FIG. 2.
Figure 5:
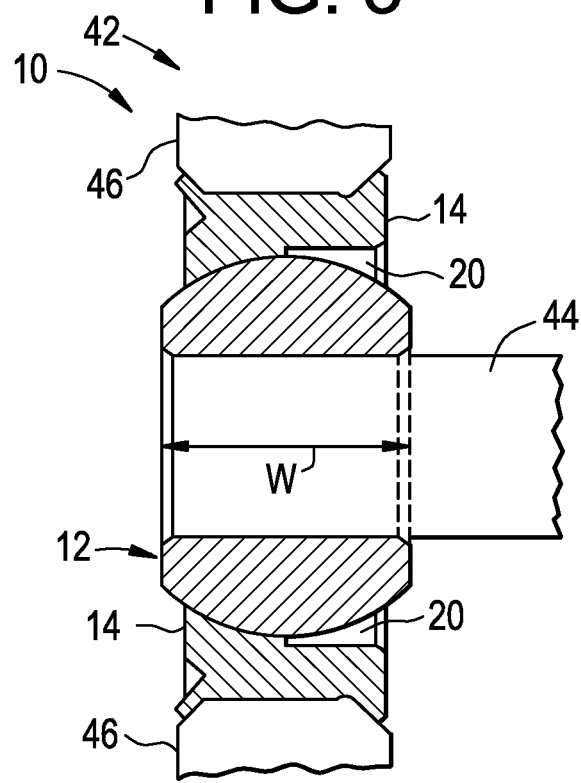
FIG. 5 is a schematic representation of a system employing a low friction load slot bearing assembly interconnected with two elements for relative movement therebetween.

Referring again to the load slot bearing, bearing assembly 10, as is shown in FIG. 3, each load slot 20 is located in a face of the outer race 14 and is defined by a first end face 26, a second end face 28, and a surface 30 connecting the first end face with the second end face. An outermost edge 29 of the surface 30 of each load slot 20 interfaces with the inner engagement surface 22. The interface of the outermost edge 29 of the surface 30 with the inner engagement surface 22 may be an angle or a radius. The distance between the first end face 26 and the second end face 28 is greater than the width W of the ball 12, as shown in FIG. 5, to allow the ball to be inserted into the outer race 14 and rotated into an assembled position as shown in FIG. 1. As shown, the two load slots 20 are diametrically opposite each other in the face of the outer race 14.

Figure 4:
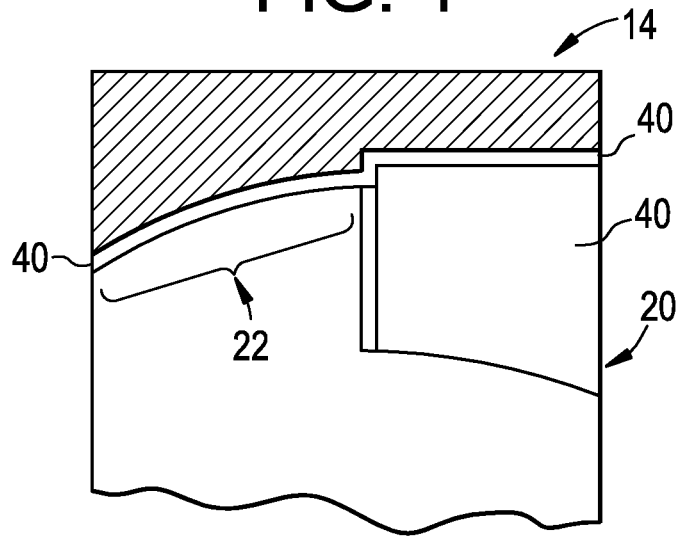
FIG. 4 is a partial sectional side view of a lubricious liner disposed on a surface of an outer race of the low friction load slot bearing assembly of FIG. 1A.

As is shown in FIG. 4, at least a portion of the inner engagement surface 22 comprises a liner 40 selected to facilitate low friction properties of the bearing assembly 10. The liner 40 may also be disposed on the surface 30 of each load slot 20. The liner 40 comprises any suitable lubricious material deposited or otherwise disposed on the inner engagement surface 22 and the surface 30. Upon assembly of the ball 12 and the outer race 14, the outer surface 18 of the ball at least partially engages the liner 40. The lubricious qualities of the material from which the liner 40 is fabricated facilitate the movement of ball 12 in the outer race 14.

One embodiment of the liner 40 comprises a polytetrafluoroethylene ("PTFE"). One embodiment of the liner 40 comprises PTFE bonded or impregnated with a thermoset resin. Another embodiment of the liner 40 comprises perfluorooctanoic acid ("PFOA") PTFE, such as Teflon®, bonded with a polyimide resin system. The present invention is not limited to the use of a polyimide resin, however, as other thermoset resins including, but not limited to, phenolic and amino resins and polyamides, are within the scope of the present invention. One embodiment of the liner 40 comprises a perfluorooctanoic acid-Free PTFE® liner. For example, the liner 40 is a Teflon® liner containing no perfluorooctanoic acid or substantially no perfluorooctanoic acid. Another embodiment of the liner 40 comprises a Teflon® liner containing perfluorooctanoic acid. One embodiment of the liner 40 comprises PTFE and a phenolic resin reinforced with fibers. For example, one embodiment of the liner 40 comprises PTFE and a layer of low-friction material, namely, a phenolic resin reinforced with aramid fibers, such as, for example, Nomex®. The fiber may comprise a plain, twill or satin weave. The present invention is not limited to the use of aramid fibers, however, as other fibers including, but not limited to, glass, polyester, glass woven with Teflon®, and carbon fibers are within the scope of the present invention. The use of PTFE and a thermoset resin reinforced provides for toughness, high wear resistance, and protection against dynamic, high frequency vibratory loads. (Nomex® and Teflon® are registered trademarks of E. I. du Pont de Nemours and Company, Wilmington, Del.).

Referring again to the spherical plain bearing 10' as shown in FIG. 1B, the inner engagement surface 22' of the outer race 14' is configured or contoured to slidingly engage or receive the correspondingly configured or contoured outer surface 18' of the ball 12'. In one embodiment, the outer ring 14' is swaged around the ball 12'. In another embodiment, the outer ring 14' is integrally formed with a housing and the integrally formed ring and housing is swaged around the ball 12'. When the ball 12' is disposed in the outer race 14', an area of engagement 30 is defined by an interface of the inner engagement surface 22' of the outer race 14' and the outer surface 18' of the ball 12'. A liner 40' selected to facilitate low friction properties of the bearing assembly 10' is disposed in the area of engagement 30. The liner 40' is fabricated from the material which the liner 40 of bearing assembly 10 is fabricated.

Hereinafter, reference to: bearing assembly 10 includes bearing assembly 10'; ball 12 includes 12'; outer race 14 includes 14'; bore 16 includes bore 16'; outer surface 18 includes outer surface 18'; inner engagement surface 22 includes inner engagement surface 22'; and liner 40 includes liner 40'.

As is shown in FIG. 5, a bearing assembly system is designated by the reference number 42 and is hereinafter referred to as "system 42." System 42 may be defined by employing one or more bearing assemblies 10 with the low friction qualities to accommodate movement between two or more moving elements or movement of one moving element relative to a stationary point. In such a system, the ball 12 is connected to a first element 44 such as a shaft or the like, and the outer race 14 is connected to, or forms part of, a second element 46 such as a housing or the like. Movement of the first element 44 relative to the second element 46 is accommodated by the bearing assembly 10 and facilitated by the liner 40 incorporated into the bearing assembly.

During operation, the inner engagement surface 22 of the outer race 14 engages and moves relative to the outer surface 18 of the ball 12. Suitable materials from which the ball 12 can be fabricated include, but are not limited to, metal, alloys such as steel, silicon nitride, silicon carbide, zirconium, and the like. Suitable materials from which the outer race 14 can be fabricated include, but are not limited to, ceramic, steel, aluminum, aluminum alloys, magnesium, magnesium alloys, and the like. The materials of either or both the ball 12 and the outer race 14 may be subjected to a high-temperature treatment process for hardening the surfaces thereof. In the alternative or additionally, the surfaces of the ball 12 and/or the outer race 14 may be subject to case hardening.

In one embodiment, the ball 12 and the outer race 14 are respectively fabricated from a corrosion-resistant stainless steel ("CRES"). In one embodiment, the ball 12 and the outer race 14 are respectively fabricated from a steel, steel alloy or proprietary alloys, including but not limited to, 4340 or 4130 alloy steel, 17-4PH, 15-5PH, PH13-8, Waspalloy, Inconel® 625, Inconel® 718, and Incoloy® alloy A-286. (Inconel® and Incoloy® are registered trademarks of Huntington Alloys Corporation.)

Figure 6:
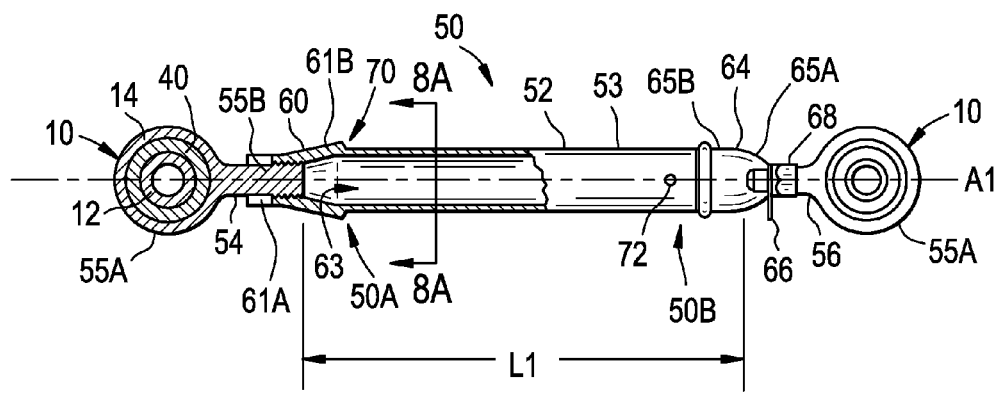
FIG. 6 is a side view of a link apparatus of the present invention.
Figure 7:
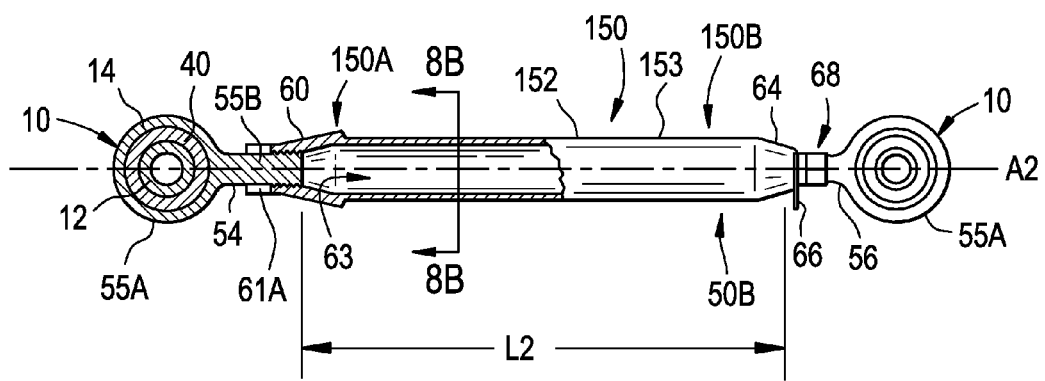
FIG. 7 is a side view of an alternate embodiment of a link apparatus of the present invention.
Figure 8A:
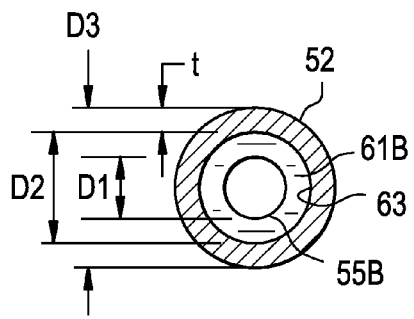
FIG. 8A is a cross-sectional view of a portion of the link apparatus of FIG. 6 taken along line 8A-8A of FIG. 6.
Figure 8B:
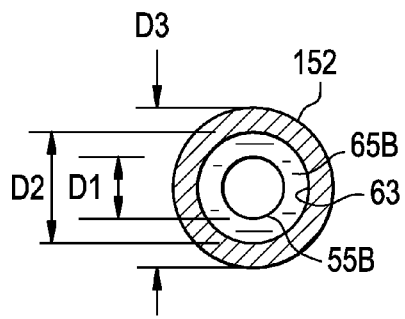
FIG. 8B is a cross-sectional view of a portion of the link apparatus of FIG. 7 taken along line 8B-8B of FIG. 7.

The bearing assembly 10 may be used in connection with a link apparatus 50 of FIG. 6 and a link apparatus 150 of FIG. 7 configured for use as a control rod, steering link, tie rod, or the like that can be employed in aircraft, aerospace, heavy equipment, or vehicular applications. Use of the bearing assembly 10 is particularly adaptive to applications that typically involve metal-to-metal bearings such as aircraft oil cooler support links that operate at temperatures in the range of about 625 degrees F. The incorporation of the liner 40 having lubricious properties provides the link apparatus 50, 150 with low friction qualities and at least reduces the cost of maintaining the bearing assemblies 10 disposed therein by reducing or eliminating manual or automated lubrication of such bearing components allowing for extended bearing life. The liner 40 exhibits lower frictional properties than dry film lubricant in bearings subjected to a load. The link apparatus 50, 150 having a lined bearing assembly 10 installed therein operates at a lower torque under load and thus can incorporate a more light-weight design than linkages having bearings lubricated with a dry film. Such a link apparatus 50, 150 is therefore less costly as well as lighter in weight.

As is shown in FIG. 6, two bearing assemblies 10 are located on opposing ends of the link apparatus 50 comprising a tubular member 52 and having a longitudinal axis A1 and a length L1 defined between a first end 50A and a second end 50B. A first rod end 54 is disposed at a first end 50A of the link apparatus 50, and a second rod end 56 is disposed at a second end 50B of the link apparatus 50. Each of the first and second rod ends 54, 56 comprises a threaded shank 55B at one end, and a socket 55A at the other end in which a bearing assembly 10 is disposed. In one embodiment, the outer race 14 of one bearing assembly 10 is integral with the socket 55A of the first rod end 54 of the link apparatus 50, and the outer race 14 of the other bearing assembly 10 is integral with the socket 55A of the second rod end 56 of the link apparatus 50. The ball 12 of each bearing assembly is attachable to any desired mechanism between which the link apparatus 50 is providing mechanical communication. In one embodiment, each bearing assembly 10, as described above, includes the load slot 20 having the liner 40, thereby imparting low friction qualities to the bearing assemblies 10.

In one embodiment, the tubular member 52 comprises a turnbuckle 53 for adjusting the tension of the link apparatus 50. At a first end of the tubular member 52, the threaded shank 55B of the first rod end 54 is threadedly received into a first conical adapter 60 employing a left-handed thread. At a second end of the tubular member 52, the threaded shank 55B of the second rod end 56 is threadedly received into a second conical adapter 64 employing a right-handed thread. Thus, tension applied to the link apparatus 50 and the bearing assemblies 10 disposed in respective ends thereof is adjustable by rotating the tubular member 52 about the axis A1 which causes each of the first rod end 54 and the second rod end 52 to be correspondingly threadedly engaged, for example, screwed in or out simultaneously, without rotating the first rod end 54 or the second rod end 52 about the axis A1.

Referring to FIG. 6, the first conical adapter 60 comprises a base 61A at one end and a conical flare 61B at another end that extends longitudinally and radially outwardly from the base 61A. A left-handed thread is formed on an inner diameter of the base 61A for threadedly receiving the threaded shank 55B of the rod end 54 therein. The second conical adapter 64 comprises a base 65B at one end and a conical flare 65B at another end that extends longitudinally and radially outwardly from the base 65A. A right-handed thread is formed on an inner diameter of the base 65A for threadedly receiving the threaded shank 55B of the rod end 56 therein.

Once the first rod end 54 and second rod end 56 are each threadedly received into the respective first conical adapter 60 and second conical adapter 64, locking devices 66 (e.g., lock washers) and nuts 68 may be used to secure the rod ends to the conical adapters. The conical flare 61B of each of the first conical adapter 60 and the second conical adapter 64 is mechanically joined or welded to the tubular member 52 at welds 70, which may extend circumferentially around a cross section of the tubular member 52. The tubular member 52 may include a welding inert gas vent hole 72.

In another embodiment of a link apparatus employing the bearing assembly 10 of the present invention, as is shown in FIG. 7, a link apparatus 150 comprises a tubular member 152 and has a longitudinal axis A2 and a length L2 defined between a first end 150A and a second end 150B. In one embodiment, the tubular member 152 comprises a turnbuckle 153 for adjusting the tension of the link apparatus 150. The bearing assemblies 10, the first rod end 54 and second rod end 56, and the first conical adapter 60 and second conical adapter 64 are the same or similar as described above. In the link apparatus 150, however, the first conical adapter 60 and the second conical adapter 64 are integral with the tubular member 152 to form a one-piece member connecting the bearing assemblies 10. In one embodiment, the first conical adapter 60 and the second conical adapter 64 are integrally formed with the tubular member 152. In one embodiment, the first conical adapter 60 and the second conical adapter 64 are formed by swage forming the ends of the tubular member 152 to facilitate internal threading or other attachment of the rod ends 52, 54 to the conical adapters 60, 64. The locking devices 66 and nuts 68 are the same or similar as in link apparatus 50. Tension applied to the link apparatus 150 and the bearing assemblies 10 disposed in respective ends thereof is adjustable by rotating the tubular member 152 about the axis A2 which causes each of the first rod end 54 and the second rod end 52 to be correspondingly threadedly engaged, for example, screwed in or out simultaneously, without rotating the first rod end 54 or the second rod end 52 about the axis A2.

In link apparatus 150 employing conical adapters that are integrally formed or swaged onto the tubular member 152, concentrated stresses are substantially less than those associated with link apparatuses in which the conical adapters are welded. From a performance perspective, link apparatus 150 also facilitates the reduction of fatigue stresses due to reverse loading.

In one embodiment, the link apparatus 50, 150 is used to support accessory devices on aerospace engines such as oil tanks, oil coolers, gear boxes, etc. Such accessory devices are quasi static and cause small movements of the ball 12 of the bearing assembly 10 disposed in the rod end 54, 56. Such movement of the ball 12 creates a moment or torque that can lead to undesired bending stresses, torsions, and deflections. In round, circular elements, increasing the diameter is the best way to counter the undesired bending stresses, torsions, and deflections. However, merely increasing the diameter of such a component correspondingly increases the weight per unit length of the component.

The threaded feature of each of the conical adapters 60 and 64 provides for the use of the threaded shank 55B of the rod ends 54, 56 rated for the appropriate load. Typically, the tubular member 52, 152 is drilled out (to hollow it for the weight savings). A bore 63 of the tubular member 52, 152 is typically machined around the thread minor diameter to facilitate the thread-forming operation. The bore 63 must comprise an inner diameter that is small enough to permit the full form of the thread for receiving the threaded shank 55B to be machined therein. The cross-sectional area of the tubular member 52, 152 must be at least equal to the weakest area section of the threaded shank 55B to prevent it from prematurely failing. The outer diameter of the tubular member 52, 152 must also be large enough to resist bending and buckling, in addition to tension and compression loading.

As shown in FIGS. 6 and 7, 8A and 8B, the tubular member 52, 152 is respectively tapped at each of the conical adapters 60 and 64 for respectively threadedly receiving therein the first rod end 54 and the second rod end 56. The threaded shank 55B defines an outer diameter D1 (neglecting a thread minor diameter) and a corresponding cross-sectional area A1. The base 61A and the base 65A of the respective conical adapter 60 and 64 correspondingly define the inner diameter D1 (neglecting a thread minor diameter). The conical flare 61B and the conical flare 65B of the respective conical adapter 60 and 64 define an inner diameter D2 where diameter D1 is less than diameter D2. It follows that the tubular member 150, 152 defines an inner diameter substantially equal to the inner diameter D2 at the joint or seam of the respective conical flare 61B and 65B to each end of the tubular member 50, 150. The tubular member 150, 152 defines an outer diameter D3 such that a cross-sectional area A2 of the tubular member 150, 152 is at least approximately equal to or greater than the cross-sectional area A1 of the threaded shank 55A such that the tubular member 150, 152 can bear a load at least approximately equal to or greater than the load applied to the rod end 54, 56. As a result, one of the conical adapters 60 and 64 or the rod end 54, 56 threadedly received therein likely will wear or fail before the tubular member 150, 152. The conical adapters 60 and 64 or the rod end 54, 56 can easily be repaired or replaced in comparison to the complexity of repairing or replacing the entire link apparatus 50, 150.

In one embodiment, the outer diameter D1 of the threaded shank 55B of the rod ends 54, 56 is 11.11 mm (0.4375 in; 7/16 inch). Thus, the cross-sectional area A1 of the threaded shank 55B is approximately 3.81 mm$^2$ (0.15 in$^2$). In one embodiment, the tubular member 52 of the link apparatus 50 shown in FIG. 6 comprises a thin-walled tube having an outer diameter D3 of about 25.4 mm (1.00 inch) and a thickness t of about 1.27 mm (0.05 inch). Thus, the cross-sectional area A2 of the thin-walled tubular member 52 is approximately equal to the cross-sectional area A1, or is approximately 3.81 mm$^2$ (0.15 in$^2$). In one embodiment, the tubular member 152 of the link apparatus 150 shown in FIG. 7 and having the inner diameter D2 of 11.11 mm (0.4375 in; 7/16 inch) must define the outer diameter D3 of 15.87 mm (0.6250 in; 5/8 inch) such that the cross-sectional area A2 is approximately equal to the cross-sectional area A1, or is approximately 3.81 mm$^2$ (0.15 in$^2$). Thus, the tubular members 52 and 152 are capable of bearing the same load as the rod end 54, 56. In addition, because the weight per unit length of a tubular member is calculated by multiplying the cross-sectional area of the tubular member by the density of the material from which the tubular member is fabricated, the weight per unit length of the larger diameter thin-walled tubular member 52 is approximately equal to the weight per unit length of the tubular member 152.

While it can be shown that the cross-sectional area A2 of certain embodiments of the tubular member 52, 152 is approximately equal to the cross-sectional area A1 of the rod end 54, 56, such a tubular member 52, 152 comprising a long hollow tubular member must also provide suitable stiffness and bending stress resistance.

The stiffness or rigidity of the tubular member 52, 152 is one measure of performance of the link apparatus 50, 150 wherein such stiffness represents the extent to which the tubular member 52, 152 resists deflection in response to an applied force (i.e., an increase in stiffness is represented by a decrease in deflection). One method for calculating stiffness comprises calculating the elastic deflection of a beam and is known as the cantilevered beam equation, expressed mathematically as: $\delta=(FL^3)/3EI$; where: $\delta$=Deflection; F=Force (or Load); L=Length; E=Modulus of Material; and I=Moment of Inertia. It follows that elastic deflection is in a reciprocal relation to the Moment of Inertia such that the greater the Moment of Inertia, the lesser the deflection of the cantilevered beam which, in turn, represents increased or improved stiffness. For configurations such as a solid tubular member defining an inner radius r, the Moment of Inertia is a function of its radius as follows: $I=(\pi/4)(r^4)$. For tubular configurations such as a tubular member defining an inner radius $r_1$ and an outer radius $r_2$, the Moment of Inertia is a function of its radii as follows: $I=(\pi/4)(r_2^4-r_1^4)$.

The Moment of Inertia of the tubular member 52 of the link apparatus 50, comprising the thin-walled tube having the outer diameter D3 of 25.4 mm (1.00 inch) and the thickness t of 1.27 mm (0.05 inch), is approximately 0.4288 mm$^4$ (0.0169 in$^4$) The Moment of Inertia of the tubular member 152 of the link apparatus 150, having the inner diameter D2 of 11.11 mm (0.4375 in; 7/16 inch) and the outer diameter D3 of 15.87 mm (0.6250 in; 5/8 inch), is approximately 0.1446 mm$^4$ (0.0057 in$^4$). It can be seen that the Moment of Inertia of the thin-walled tubular member 52 is substantially greater than the Moment of Inertia of the tubular member 152. Thus, the deflection of the thin-walled tubular member 52 is substantially lesser than the deflection of the tubular member 152. It follows that the stiffness of the thin-walled tubular member 52 is substantially greater than the stiffness of the tubular member 152. In the illustrated embodiments, the stiffness of the thin-walled tubular member 52 is substantially greater than the tubular member 152 by approximately 300%. In one embodiment, the outer diameter D3 of the thin-walled tubular member 52 is 25.4 mm (1.00 inch) and the thickness t of the thin-walled tubular member 52 is 1.245 mm (0.049 inch).

The bending stress of the tubular member 52, 152 is another measure of performance of the link apparatus 50, 150 wherein such bending stress represents the capacity of the tubular member 52, 152 to bear an external load applied perpendicularly to the longitudinal axis A of the element. Primarily, the link apparatus 50, 150 is in tension and is subjected to bending stress when the ball 12 of the bearing assembly 10 disposed in the rod end 54, 56 moves by rotating, swiveling, and/or misaligning. One method for calculating the bending stress is expressed mathematically as: k=(TL)/I; where: k=bending stress; T=applied torque; L=Length; and I=Moment of Inertia. Similar to the calculation of the elastic deflection, it follows that the bending stress is in a reciprocal relation to the Moment of Inertia such that the greater the Moment of Inertia, the lesser the bending stress to which the tubular member 52, 152 is subjected.

As described herein above with respect to stiffness, it can be seen that the Moment of Inertia of the thin-walled tubular member 52 is substantially greater than the Moment of Inertia of the tubular member 152. Thus, the bending stress to which the thin-walled tubular member 52 is subjected is substantially lesser than the bending stress to which the tubular member 152 is subjected. In the illustrated embodiments, the bending stress to which the thin-walled tubular member 52 is substantially reduced in comparison to the bending stress to which the tubular member 152 is subjected by approximately 300%.

The tubular member 52, 152 of the link apparatus 50, 150 is fabricated from a steel, steel alloy or proprietary alloys, including but not limited to, CRES, 4340 or 4130 alloy steel, 17-4PH, 15-SPH, PH13-8, Waspalloy, Inconel® 625, Inconel® 718, and Incoloy® alloy A-286. (Inconel® and Incoloy® are registered trademarks of Huntington Alloys Corporation.) The tubular member 52, 152 can be fabricated from other materials that are sufficiently hard or can be sufficiently hardened through heat treatment. The tubular member 52, 152 can be plated or coated, and a self-lubricating treatment can be applied to any threaded surface of the tubular member 52, 152 for easy disassemble and maintenance operations.

In one embodiment, the link apparatus 50, 150 includes: the turnbuckle 53, 153 comprising the tubular member 52, 152 fabricated from CRES; the first and second conical adapters 60 and 64 disposed at respective ends thereof; each of the first and second conical adapters 60 and 64 having a bearing assembly 10 disposed therein; and each of the bearing assemblies 10 comprise PTFE lined bearings to lower moment loading torque under load in the link apparatus. Such an embodiment of the link apparatus 50, 150 provides a unique installation, repair and/or retrofit opportunity utilizing an adjustable turnbuckle alloy and welded-end or threaded conical adapter design that can be serviced when the bearings wear out by simply unthreading the rod ends and installing new rod ends and reusing the lightweight, rigid CRES turnbuckle. The PTFE lined bearings can comprise the load slot bearing assembly 10, the spherical plain bearing assembly 10' or the spherical plain bearing assembly 10' comprising a swaged bearing construction.

The welded conical threaded end fittings, the first and second conical adapters 60 and 64 of turnbuckle 53 of FIG. 6, provide for the use of a larger diameter, thinner walled, light weight tube for fabricating the turnbuckle 53. The threaded ends of the first and second conical adapters 60 and 64 of turnbuckle 53, 153 provide for use of different materials more suited for bearings resisting minute movements and fretting damage. Thus, when the bearings wear out, they can easily be replaced by unthreading the respective rod end 54, 56 having the worn bearing disposed therein and then threading in a new rod end 54, 56 having a new bearing disposed therein.

In one embodiment, the tubular member 52, 152 is fabricated from alloy A-286 which provides for operating the tubular member 52, 152 in a temperature range of up to about 625 degrees F. Such alloy is readily available as thin walled tubing such as thin-walled tubing having a thickness of 1.245 mm (0.049 inch). In addition, such alloy provides strong weldability characteristics and may be heated treated, for example by precipitation heat treatment, with no distorting liquid quenching.

Figure 9:
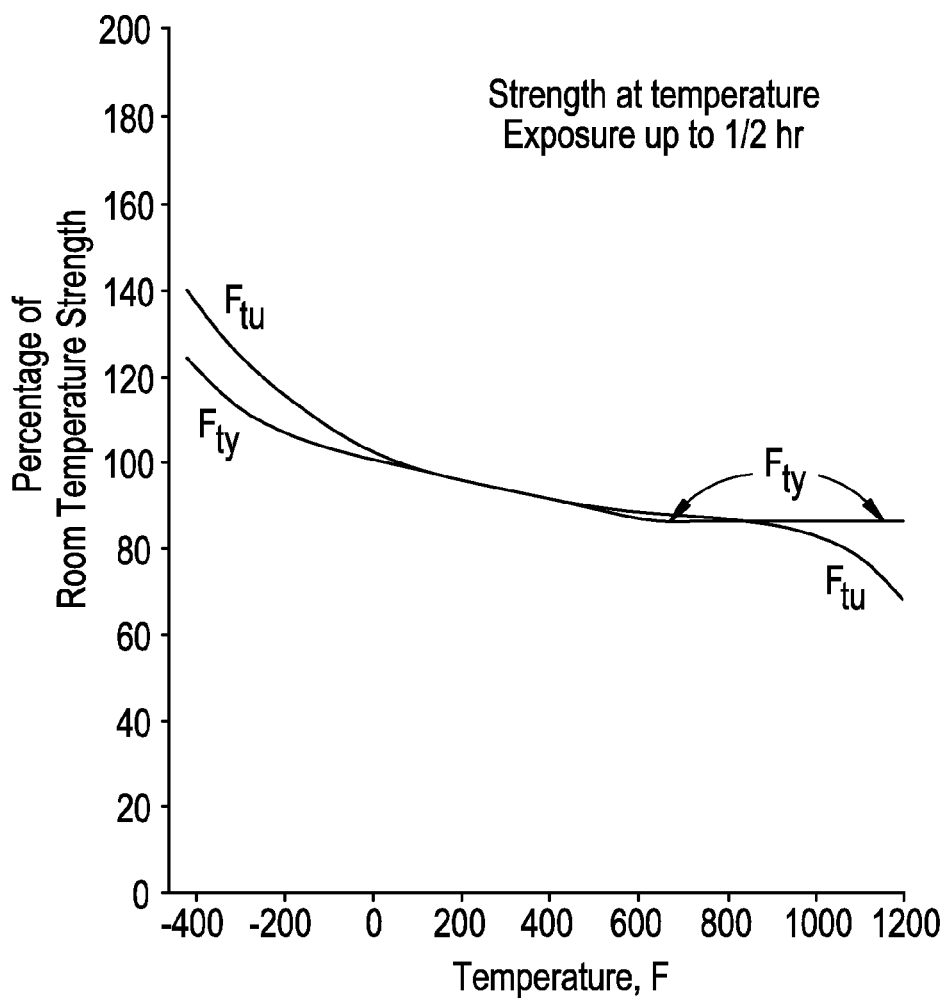
FIG. 9 is a graphical representation of the ultimate tensile strength of a link apparatus of the present invention as a function of temperature.
Figure 10:
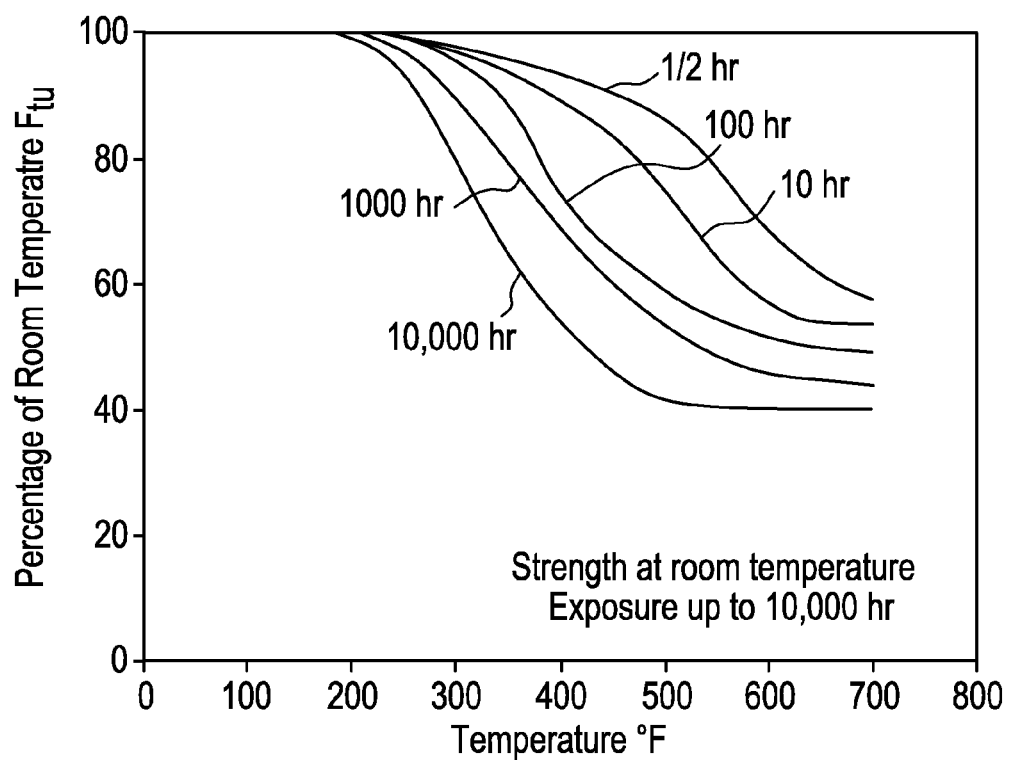
FIG. 10 is a graphical representation of the ultimate tensile strength of another link apparatus of the present invention as a function of temperature.

A graphical representation of the ultimate tensile strength ("UTS") of a link apparatus 50, 150 as a function of temperature is shown in FIG. 9. The link apparatus 50, 150 includes the tubular member 52, 152 fabricated from alloy A-286. As is depicted in the graph, the A-286 material exhibits a UTS at room temperature defined as 100%; and such material maintains 90% of such UTS at 625 degrees F. In comparison and as is shown in FIG. 10, a 2024 T3 aluminum alloy exhibits a UTS at room temperature defined as 100%; and such material maintains only 40% of its strength at 625 degrees F. Thus, the typical swaged aluminum alloy tube used for fabricating a typical turnbuckle is obviously not a preferred option.

Although swaged tube turnbuckle may be fabricated from alloy A-286, such a configuration is fabricated by a hot metal forming process, or requires multiple hammer operations and annealing operations to produce the final product, which substantially increases the cost of the link apparatus 50, 150. In comparison, the use of standard thin-walled tubing fabricated from alloy A-286 for forming the tubular member 52, 152, machining conical adapters 60 and 64 and welding them to respective ends of the tubular member 52, 152, followed by a single solution heat treat, provides for a substantially lower cost to produce the link apparatus 50, 150. Such machining, welding, and heat treatment operations are far easier operations to perform and are substantially lower in cost compared to the swage tube forming of alloy A-286. In addition, alloy A-286 is less costly than Inconel and Titanium. Moreover, the complexity of swage tube forming the Inconel and Titanium alloys drives the cost of using such alloys even higher.

Typically, alloy A-286 is costly to procure and machine compared to Inconel 625, Inconel 718, and 6A1-4V Titanium. In addition, alloy A-286 is not an easy material to work with in the manufacture of swage tubes. Accordingly, the selection of alloy A-286 for fabricating the tubular member 52, 152 of the link apparatus 50, 150 would not be favored. Unexpectedly, fabricating the tubular member 52, 152 from alloy A-286 thin-walled tubing having a wall thickness of about of 1.245 mm (0.049 inch) provides for the configuration of the tubular member 52, 152 having a larger outer diameter over its length. In one embodiment, the length L of the tubular member 52, 152 is between about 152.4 mm (6 inches) to about 609.6 mm (24 inches).

In one embodiment, the link apparatus 50, 150 is used to support accessory devices on aerospace engines such as oil tanks, oil coolers, gear boxes, etc. Such accessory devices are quasi static, but experience small movements of the ball 12 of the bearing assembly 10 disposed in the rod end 54, 56 create a moment or torque that can lead to undesired bending stresses, torsions, and deflections. In round, circular elements, increasing the diameter is the best way to counter the undesired bending stresses, torsions, and deflections; but increasing the diameter increases weight. However, the link apparatus 50, 150, including the tubular member 52, 152 fabricated from alloy A-286 thin-walled tubing having a wall thickness of about of 1.245 mm (0.049 inch), provides for the configuration of the tubular member 52, 152 having a larger outer diameter over its length without increasing its weight per unit length in comparison to the tubular member 52, 152 having the inner diameter D2 of 11.11 mm (0.4375 in; 7/16 inch) and the outer diameter D3 of 15.87 mm (0.6250 in; 5/8 inch).

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A link apparatus comprising:
a tubular member manufactured from a material having at least a 90% retention of ultimate tensile strength at a temperature of up to 329.44° Celsius (625° Fahrenheit), the tubular member having a first diameter and a first lateral cross-sectional area;
a first conical adapter having a first base and a first conical flare, the first conical flare being mechanically joined to a first end of the tubular member, the first conical flare defining a second diameter defined by an inner diameter of the first conical flare and having a magnitude configured to engagingly receive the first diameter, the first base member having a right hand threaded end defined by a third diameter which is less than the second diameter;
a second conical adapter having a second base and a second conical flare, the second conical flare being mechanically joined to a second end of the tubular member, the second conical flare defining a fourth diameter equal to the second diameter, the second base member having a left hand threaded end defined by a fifth diameter equal to the third diameter;
a first rod end having a first threaded shank and a first socket, the first threaded shank removably threaded into the right hand threaded first base of the first conical adapter, the first socket having a first bearing assembly disposed therein;
a second rod end having a second threaded shank and a second socket, the second threaded shank removably threaded into the left hand threaded second base of the second conical adapter, the second socket having a second bearing assembly disposed therein; and
each of the first bearing assembly and the second bearing assembly comprising,
an outer race having an inner engagement surface,
a ball having an outer surface and a bore extending therethrough, the ball disposed at least partially in the outer race, the outer race being misalignable and rotatable in relation to the ball,
an area of engagement defined by an interface of the inner engagement surface of the outer member and the outer surface of ball, and
a liner configured to reduce friction disposed within the area of engagement;
the liner mitigating moment loading on the tubular member;
the first rod end and the second rod end each having a second lateral cross-sectional area;
the first cross-sectional area of the tubular member is at least as great as the second cross sectional area of the first and second rod ends; and
the tubular member being tensionable by rotation relative to the first and second rod ends.

2. The link apparatus of claim 1, wherein the first and second cross-sectional areas are approximately 3.81 mm$^2$ (0.15 in$^2$).

3. The link apparatus of claim 1, wherein:
the tubular member is rotatable about a longitudinal axis;
such rotation causing the first conical flare of the first conical adapter to threadedly engage the first threaded shank of the first rod end, and the second conical flare of the second conical adapter to threadedly engage the second threaded shank of the second rod end; and
thereby applying tension to the tubular member and the first and second bearing assemblies.

4. The link apparatus of claim 1, wherein the first outer diameter of the tubular member is about 25.4 mm (1.00 inch) and a thickness t of the tubular member is about 1.27 mm (0.05 inch).

5. The link apparatus of claim 1, wherein the first outer diameter of the tubular member is 25.4 mm (1.00 inch) and a thickness t of the tubular member is 1.27 mm (0.049 inch).

6. The link apparatus of claim 5, wherein the tubular member is fabricated from alloy A-286.

7. The link apparatus of claim 1, wherein the tubular member is fabricated from alloy A-286.

8. The link apparatus of claim 1, wherein the outer race of the first bearing assembly is integral with the first socket of the first rod end, and the outer race of the second bearing assembly is integral with the second socket of the second rod end.

9. The link apparatus of claim 1, wherein the mechanical joining comprises at least one weld.

10. The link apparatus of claim 1, wherein the mechanical joining comprises at least one swaged end of the tubular member.

11. The link apparatus of claim 1, wherein the liner comprises polytetrafluoroethylene.

12. The link apparatus of claim 1, wherein the liner comprises perfluorooctanoic acid polytetrafluoroethylene.

13. The link apparatus of claim 1, wherein the liner comprises perfluorooctanoic acid free polytetrafluoroethylene.

14. The link apparatus of claim 1, wherein at least one of the first and second bearing assemblies comprise a load slot bearing assembly.

* * * * *